United States Patent [19]

Capps, Jr. et al.

[11] Patent Number: 5,787,290
[45] Date of Patent: Jul. 28, 1998

[54] ADAPTER WITH AN ONBOARD INTERRUPT CONTROLLER FOR CONTROLLING A COMPUTER SYSTEM

[75] Inventors: Louis Bennie Capps, Jr., Round Rock; Son Hung Lam, Austin; An Xuan Tra, Round Rock, all of Tex.

[73] Assignee: International Business Machines Corporation, Armonk, N.Y.

[21] Appl. No.: 769,843

[22] Filed: Dec. 20, 1996

[51] Int. Cl.$^6$ ............... G06F 13/14; G06F 9/46
[52] U.S. Cl. ............ 395/733; 395/739; 395/868
[58] Field of Search ............... 395/733–739, 395/868, 869

[56] References Cited

U.S. PATENT DOCUMENTS

| | | | |
|---|---|---|---|
| 4,200,916 | 4/1980 | Seipp | 364/900 |
| 4,275,458 | 6/1981 | Khera | 364/900 |
| 5,077,662 | 12/1991 | Hutson | 395/725 |
| 5,101,497 | 3/1992 | Culley et al. | 395/734 |
| 5,237,692 | 8/1993 | Raaseh et al. | 395/740 |
| 5,261,107 | 11/1993 | Klim et al. | 395/739 |
| 5,283,904 | 2/1994 | Carson et al. | 395/739 |
| 5,297,282 | 3/1994 | Meilak et al. | 395/750.05 |
| 5,408,643 | 4/1995 | Katayose | 395/185.05 |
| 5,410,708 | 4/1995 | Miyamori | 395/737 |
| 5,448,743 | 9/1995 | Gulick et al. | 395/869 |
| 5,495,616 | 2/1996 | Henry et al. | 395/741 |
| 5,555,430 | 9/1996 | Gephardt et al. | 395/800 |
| 5,568,644 | 10/1996 | Nelson et al. | 395/741 |
| 5,619,706 | 4/1997 | Young | 395/741 |
| 5,684,997 | 11/1997 | Kau et al. | 395/733 |

OTHER PUBLICATIONS

"The Open Programmable Interrupt Controller (PIC) Register Interface Specification Revision 1.2", Issue Date October 1995, Issued Jointly by Advanced Micro Devices and Cyrix Corporation, pp. 3–22.

*IBM Technical Disclosure Bulletin*, vol. 22, No. 2, Jul. 1979, pp. 757–759, "Microprocessor Interrupt System Extension".

*IBM Technical Disclosure Bulletin*, vol. 24, No. 5, Oct. 1981, pp. 2303–2306, "Programmable, Expandable Interrupt Controller".

*IBM Technical Disclosure Bulletin*, vol. 24, No. 10, Mar. 1982, pp. 4920–4922, "Interrupt Generator Device".

*Primary Examiner*—Gopal C. Ray
*Attorney, Agent, or Firm*—Volel Emile

[57] ABSTRACT

A CHRP compliant Apple adapter is provided. The adapter comprises an onboard interrupt controller to control a peripheral component interconnect (PCI) based computer system. The adapter also comprises a mechanism for disabling a pre-existing system interrupt controller. The onboard interrupt controller contains an interrupt request input for each of a plurality of I/O devices attached to the computer system and also provides an interrupt request to a processor.

9 Claims, 2 Drawing Sheets

ADAPTER WITH AN ONBOARD INTERRUPT CONTROLLER FOR CONTROLLING A COMPUTER SYSTEM

RELATED APPLICATIONS

This present patent application is related to application Ser. No. 08/769,844, filed on Dec. 20, 1996 entitled METHOD AND APPARATUS FOR UPGRADING A PCI SYSTEM TO A CHRP SYSTEM (IBM docket no. AT9-96-324).

BACKGROUND OF THE INVENTION

1. Field of the Invention

The present invention relates generally to an Apple adapter and, more particularly, to an Apple adapter having a programmable interrupt controller for controlling a peripheral component interconnect (PCI) based computer system.

2. Description of the Related Art

In computer systems that require a variety of system functions to be controlled in a nonsequential fashion, it is a common practice to employ interrupts to determine the order in which various operations are to be performed by the processor. Each interrupt is generated in response to the occurrence of a predetermined event in the operation of the system. When the processor receives an interrupt request, it stops its present operation at an appropriate point and proceeds to a predetermined subroutine that controls the function associated with that particular interrupt.

Each computer bus architecture has a predetermined number of interrupt lines that are available for use in servicing system functions. For example, a typical peripheral component interconnect (PCI) bus architecture provides dedicated interrupt lines that are used by system based devices and four interrupt request lines available to PCI upgrade slots for PCI adapters. These request lines may be shared by as many devices as are attached to the computer system.

CHRP or common hardware reference platform is a computer architecture that has been developed by IBM, Apple and Motorola. CHRP requires that computer systems based on the PowerPC (trademark of Internal Business Machines Corporation) computer architecture and the Apple computer architecture be compatible to each other. PowerPC computer systems use the PCI bus architecture and thus have four interrupt request lines available for additional devices. The bus architecture of the Apple computers allows more than four additional devices and does not allow for the sharing of interrupt request lines among the various devices. Instead, the Apple computer architecture dictates that each device have its own dedicated interrupt request line(s). Accordingly, the bus architecture of Apple computers provides for many more than four interrupt request lines.

Thus, there is a need in the art for an apparatus and method of allowing an Apple adapter to be used in a PCI based computer system.

SUMMARY OF THE INVENTION

The need in the art is addressed by the present invention. The present invention provides a CHRP compliant Apple adapter. The adapter comprises an onboard interrupt controller to control a peripheral component interconnect (PCI) based computer system. The adapter also comprises a mechanism for disabling a pre-existing system interrupt controller. The onboard interrupt controller contains an interrupt request input for each of a plurality of I/O devices attached to the computer system and also provides an interrupt request to a processor.

DESCRIPTION OF THE INVENTION

Figure 1:
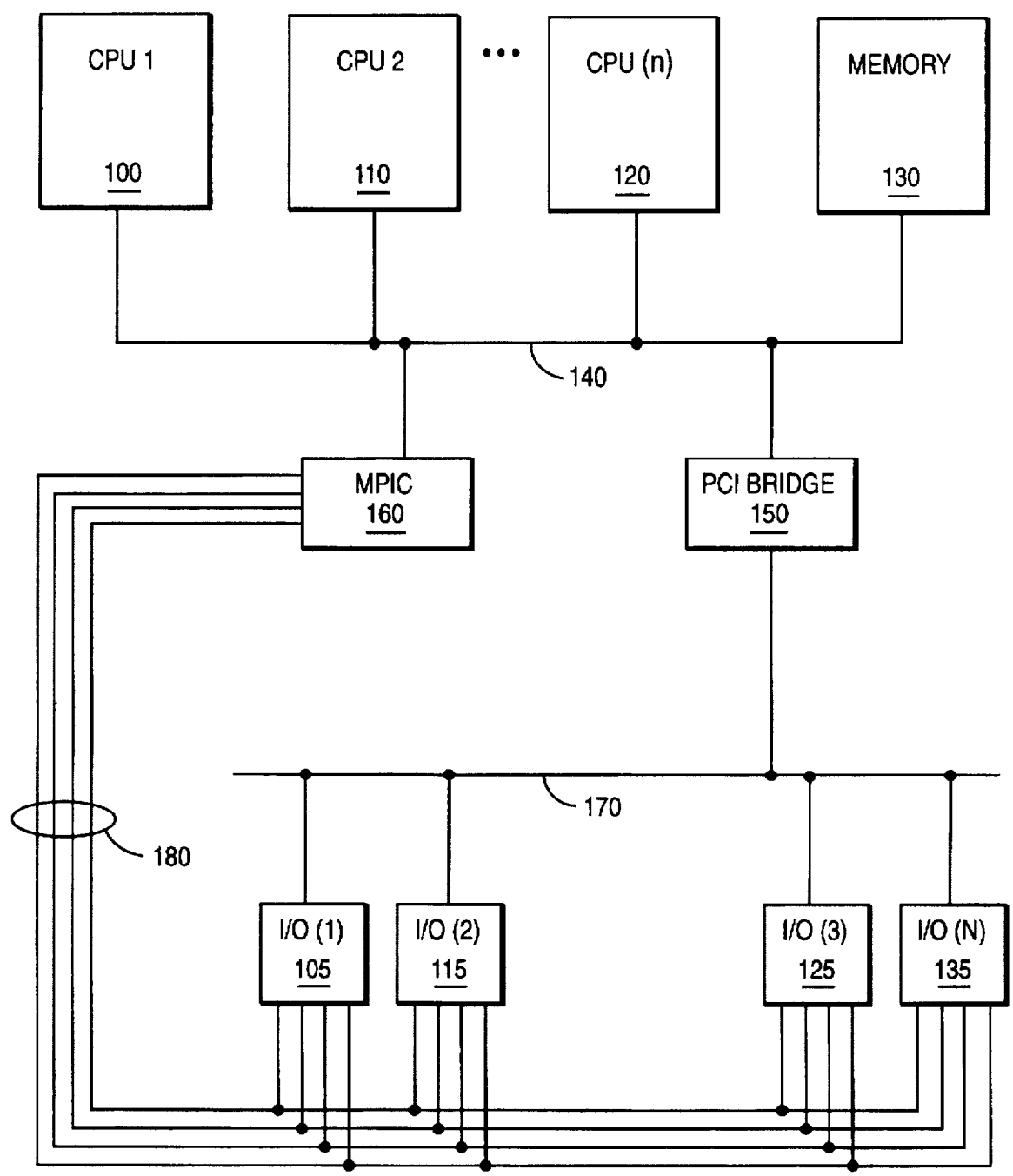
FIG. 1 is a block diagram of an exemplary PCI system.

FIG. 1 is a block diagram of an exemplary PCI system. Such computer may take the form of a workstation such as the RS/6000 systems marketed by the IBM Corporation, although the invention is not intended to be so limited and is equally applicable to essentially any computer system.

Nonetheless, FIG. 1 comprises processors 100, 110 and 120 connected to a system memory 130, a PCI bridge 150 and a multiprocessor programmable interrupt controller (MPIC) 160 by a system bus 140. Connected to the PCI bridge 150 by a PCI bus 170 are input/output (I/O) devices 1, 2, 3 through (n) referred to by reference numbers 105, 115, 125 and 135, respectively. The devices 105, 115, 125 and 135 may be any of the following: graphics adapters, communication adapters, network adapters, compact disk, floppy disk, hard disk drives, keyboard adapters, printer adapters, etc.

The devices 105, 115, 125 and 135 are also connected to the MPIC 160 by interrupt request lines 180. The interrupt request lines 180 can be a single line if the devices are one-function devices, two lines if they are dual-function devices etc. When the MPIC 160 receives an interrupt request from any of the devices, it forwards the request to the correct one of the CPUs 100, 110 and 120. If all the devices assert their interrupt request lines at the same time, the MPIC 160 ascertains that each device is serviced by the proper CPU in turn. This is accomplished in the following manner. Upon receiving an interrupt request, the MPIC 160 accesses an internal priority table that holds the priorities for each interrupt level. Based on the highest level of the interrupts being asserted, the MPIC 160 forwards the request to the correct one of the CPUs 100, 110 and 120 and then communicates to the correct CPU what level interrupt requires service. Once the correct CPU acknowledges the request, the MPIC 160 then determines the next highest priority level interrupt requiring service using the internal priority table.

If a device has a priority interrupt, it will be programmed in the MPIC 160 as such. If there are different levels of priority interrupt, the devices will be polled and serviced according to their particular level of priority. A fuller disclosure of the MPIC 160 architecture can be found in the Open Programmable Interrupt Controller (PIC) Register Interface Specification, Revision 1.2 by Advanced Micro Devices and Cyrix Corporation, October 1995. This disclosure is hereby incorporated by reference.

Figure 2:
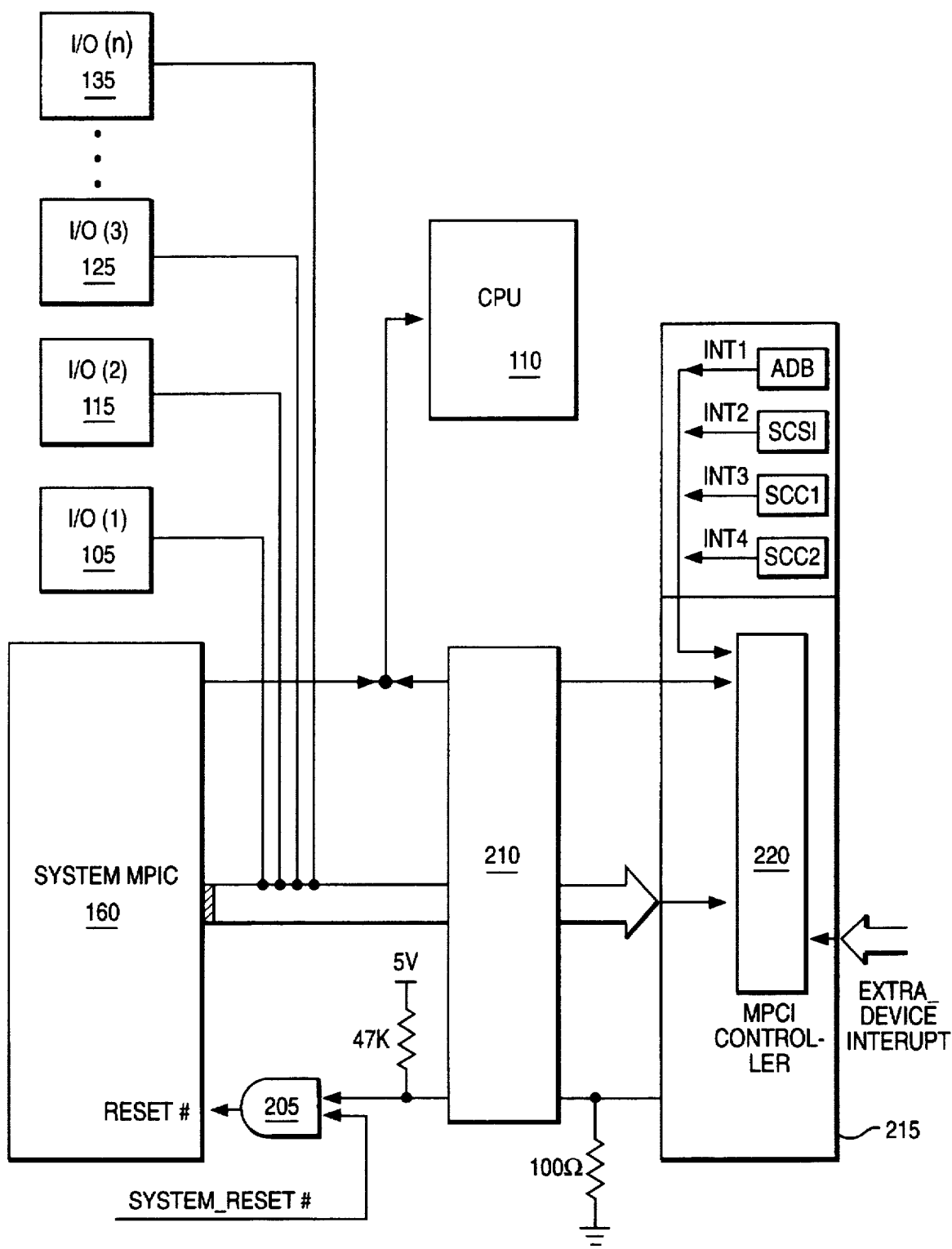
FIG. 2 is a block diagram of an interrupt controller incorporating the invention.

FIG. 2 is a block diagram of an interrupt controller incorporating the invention. In FIG. 2 are shown the I/O devices 105, 115, 125 and 135 connected to an interrupt upgrade connector (IUC) 210. The IUC 210 is further connected to the MPIC 160 and to an Apple adapter 215 which is plugged into one of the PCI slots of the system. The IUC 210 performs a multiplicity of functions. First, it IUC 210 performs a multiplicity of functions. First, it assigns a dedicated interrupt request line to each of the PCI adapters 105, 115, 125 and 135. (Note that the IUC 210 assigns as many interrupt request lines to the devices as are needed. For example, if a device is a dual-function device, the device will be assigned two interrupt request lines.) These interrupt request lines are then forwarded to an MPIC 220 located in the Apple adapter 215. Second, the IUC 210 forwards the interrupt line from the MPIC 220 in the Apple adapter 215 to the CPU 110. Note that here only one CPU is shown in order to simplify the figure. However just as in FIG. 1, there may be a plurality of CPUs (i.e., CPUs 100, 110 and 120). Third, as is explained in the next paragraph, the IUC 210, in conjunction with an AND gate 205, is used to disable the MPIC 160 so as to allow only one functional MPIC in the system.

The AND gate 205 receives two inputs: a system reset input and an input from the IUC 210. The output of the AND gate is connected to the reset port of the MPIC 160. On one side of the IUC 210, the input from the IUC 210 is connected to a load resistor (i.e., 100Ω). On the other side of the IUC, the input line is connected to a 5 v source through a 4.7Ω resistor. The system reset signal is ordinarily a logical "1" unless the system has to be reset at which point it becomes a logical "0". When the Apple adapter is plugged into the PCI slot, the load resistor draws the 5 v source to ground and thus provides a logical "0" as the input to the AND gate. Consequently, the output of the AND gate is a logical "0" effectively disabling the MPIC 160 by keeping it in the reset state. When the Apple adapter 215 is not present, the AND gate receives a logical "1" due to the 5 v source. The output of the AND gate, in this instance, is a logical "1" allowing the MPIC 160 to be operational.

The MPIC 220 in the Apple adapter 215 has many more inputs than the MPIC 160. For example, it has an input for each of the request lines provided by the IUC 210. In addition, it has an input for the Adapter description block (ADB) device, the small computer system interface (SCSI) device and the serial communications controller (SCC) devices 1 and 2 of the Apple adapter. Furthermore, it may have additional inputs for devices such as PCI—PCI bridges, industry standard architecture (ISA) bridges and extended ISA (EISA) bridges, extra PCI slots, additional I/O devices etc.

Just as the MPIC 160, the MPIC 220 may be programmed to have the CPUs service a certain device first. For example, there may be a look-up table on which the devices and their priority level are recorded. Hence, when the MPIC 220 receives interrupt signals from multiple devices, it checks the table to determine in which order the devices have to be serviced.

Although the present invention has been fully described above with reference to specific embodiments, other alternative embodiments will be apparent to those of ordinary skill in the art. For example, the AND gate, load resistor and voltage source may be located on the Apple adapter and the IUC 210 can provide the output of the AND gate to the MPIC 160 as well as the system reset signal to the AND gate. Therefore, the above description should not be taken as limiting the scope of the present invention defined by the appended claims.

What is claimed is:

1. An adapter for a first computer system being operable in a second computer system comprising:

an onboard interrupt controller;

means for disabling an in-system interrupt controller, said in-system interrupt controller being part of said second computer system; and means for allowing said onboard interrupt controller to functionally replace said in-system interrupt controller.

2. The adapter of claim 1 wherein said disabling means includes a logical gate whose output induces said in-system interrupt controller to remain in a reset state.

3. The adapter of claim 2 wherein one of two inputs of said logical gate is connected to a load resistor and a voltage source, said load resistor for drawing said voltage source to ground.

4. A method for utilizing an adapter, made for a first computer system, in a second computer system comprising the steps of:

disabling an in-system interrupt controller, said in-system interrupt controller being part of said second computer system; and allowing an onboard interrupt controller to functionally replace said in-system interrupt controller, said onboard interrupt controller being part of said adapter.

5. The method of claim 4 wherein said step of disabling includes the step of using a logical gate whose output induces said in system interrupt controller to remain in a reset state.

6. The method of claim 5 wherein one of two inputs of said logical gate is connected to a load resistor and a voltage source, said load resistor for drawing said voltage source to ground.

7. A system comprising:

a processor for processing data;

an adapter having an onboard interrupt controller;

an in-system interrupt controller;

means for disabling said in-system interrupt controller; and means for allowing said onboard interrupt controller to functionally replace said in-system interrupt controller.

8. The system of claim 7 wherein said disabling means includes a logical gate whose output induces said in-system interrupt controller to remain in a reset state.

9. The system of claim 8 wherein one of two inputs of said logical gate is connected to a load resistor and a voltage source, said load resistor for drawing said voltage source to ground.

* * * * *